Dec. 3, 1929.　　　G. SAGUE　　　1,738,119
INSERTING MACHINE
Filed March 16, 1926　　12 Sheets-Sheet 3
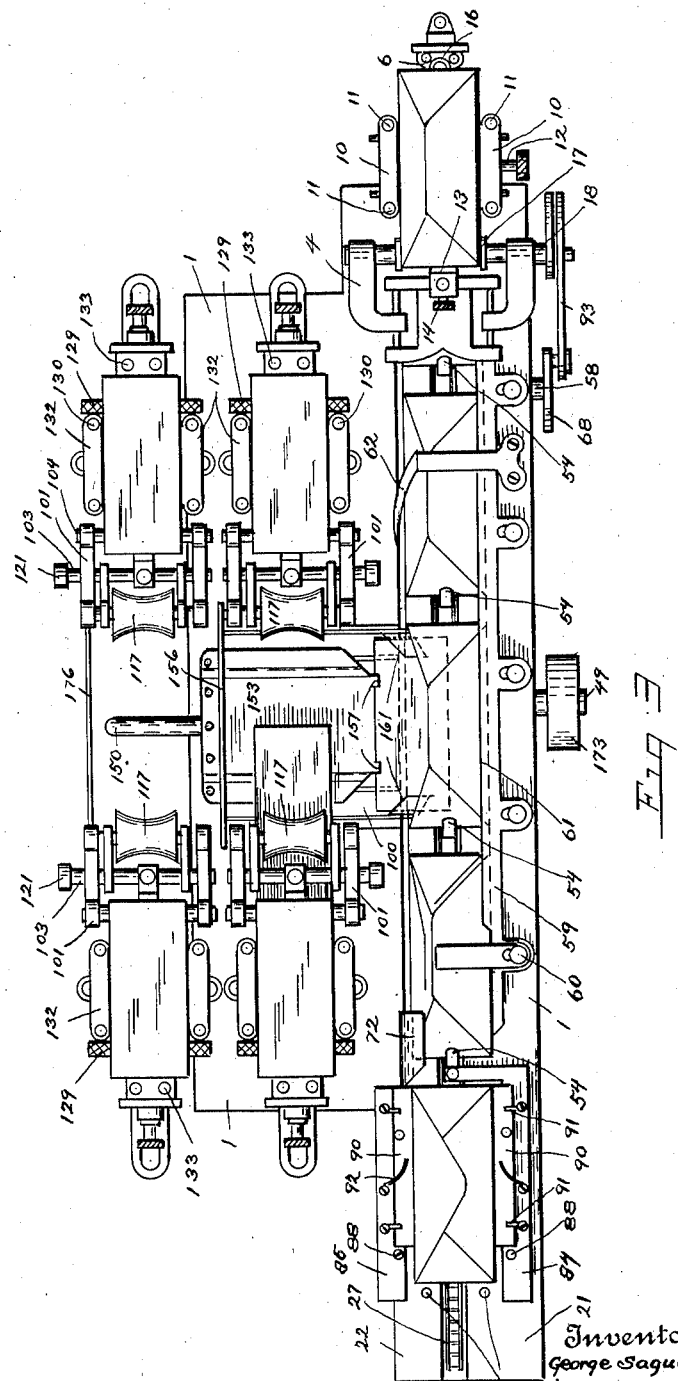
Inventor
George Sague
By his Attorney John J. Thompson Dec. 3, 1929.  G. SAGUE  1,738,119
INSERTING MACHINE
Filed March 16, 1926  12 Sheets-Sheet 4
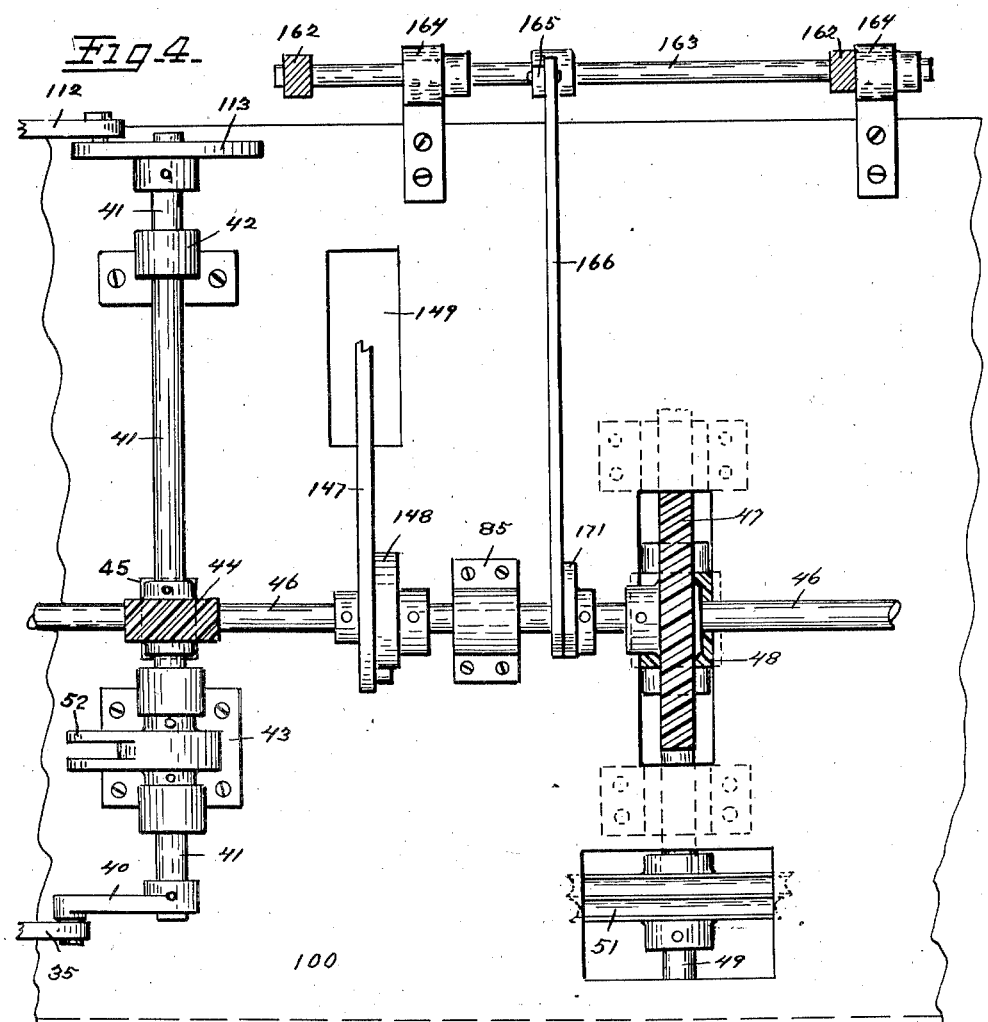
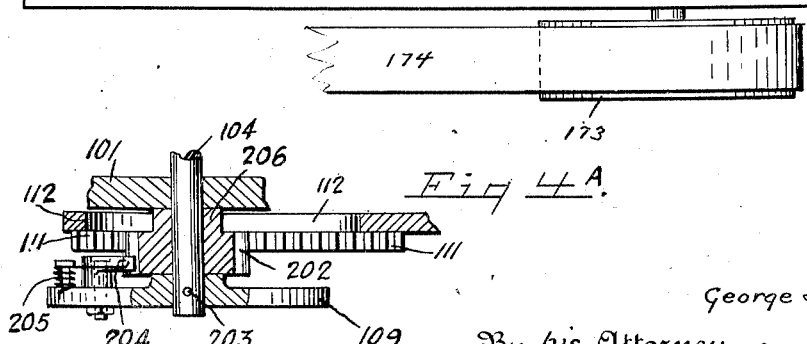
Inventor
George Sague
By his Attorney

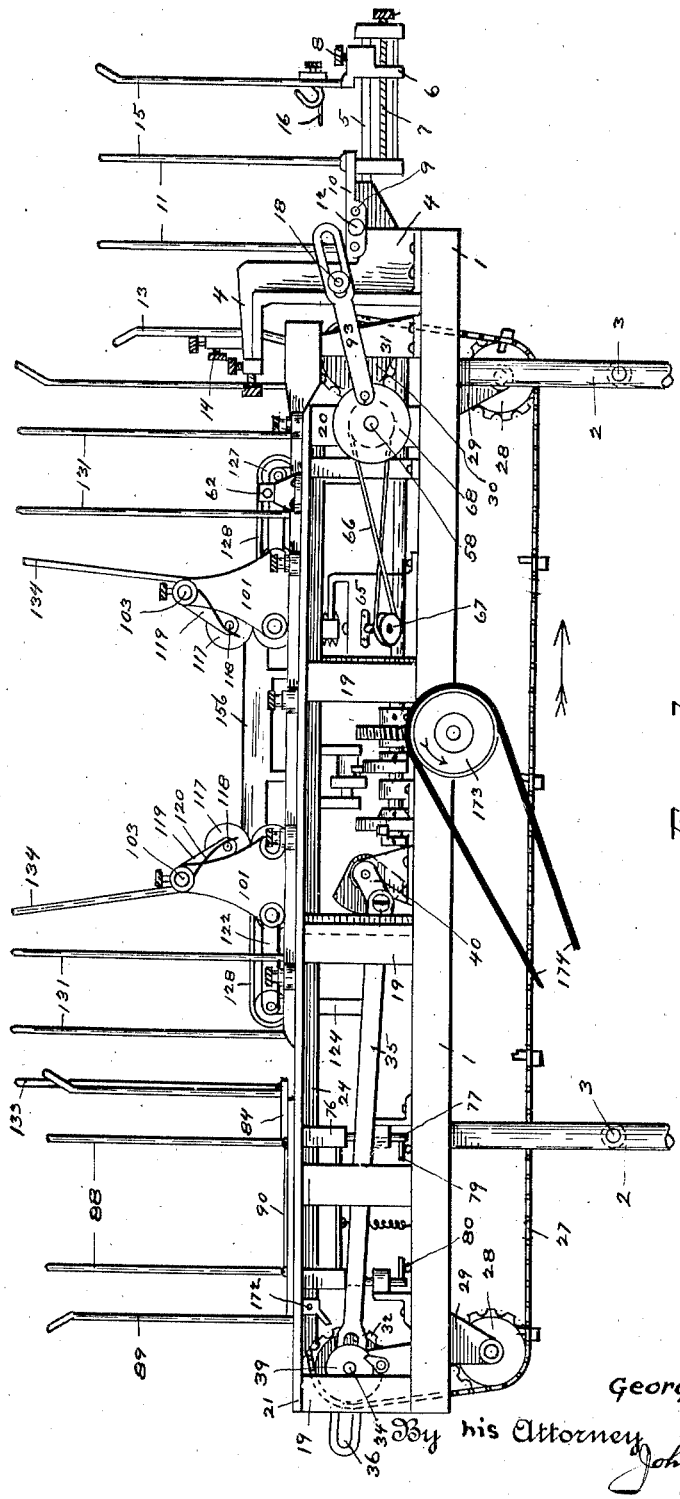

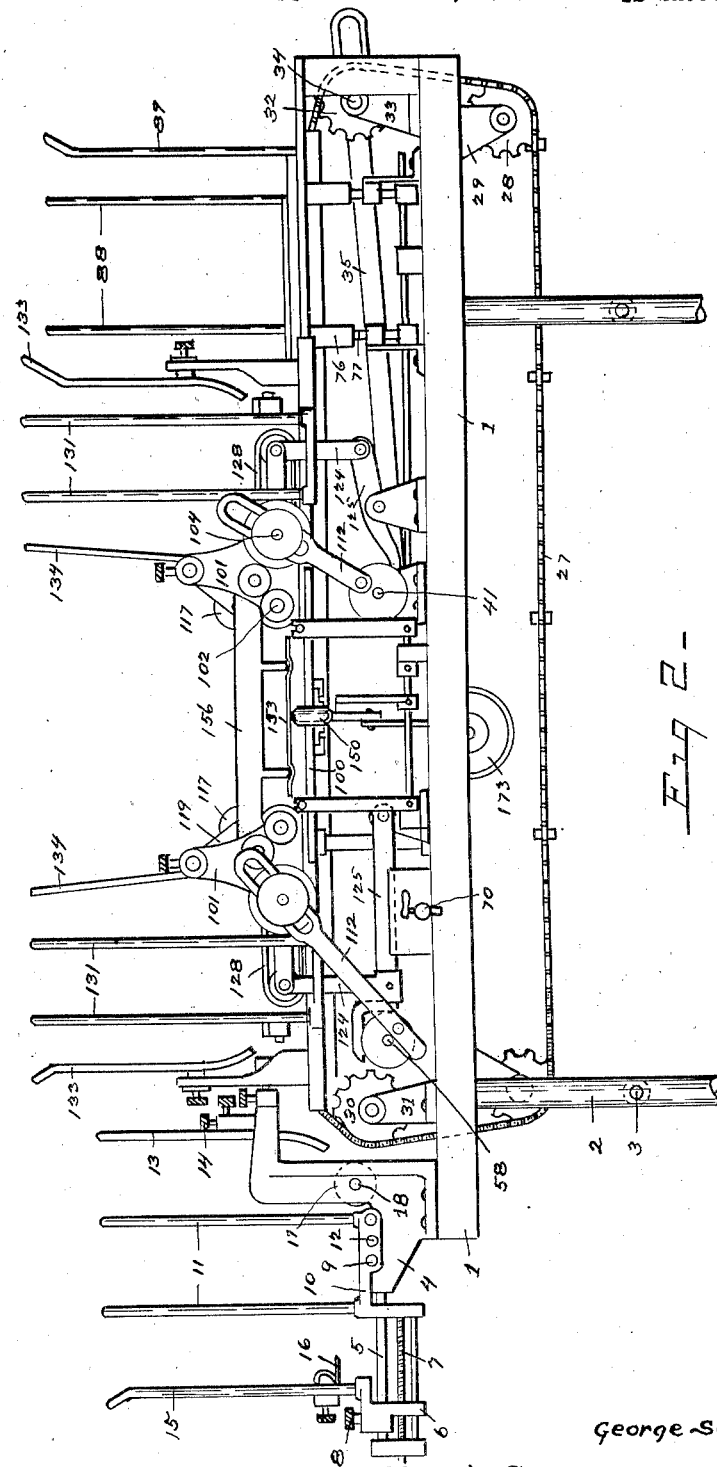

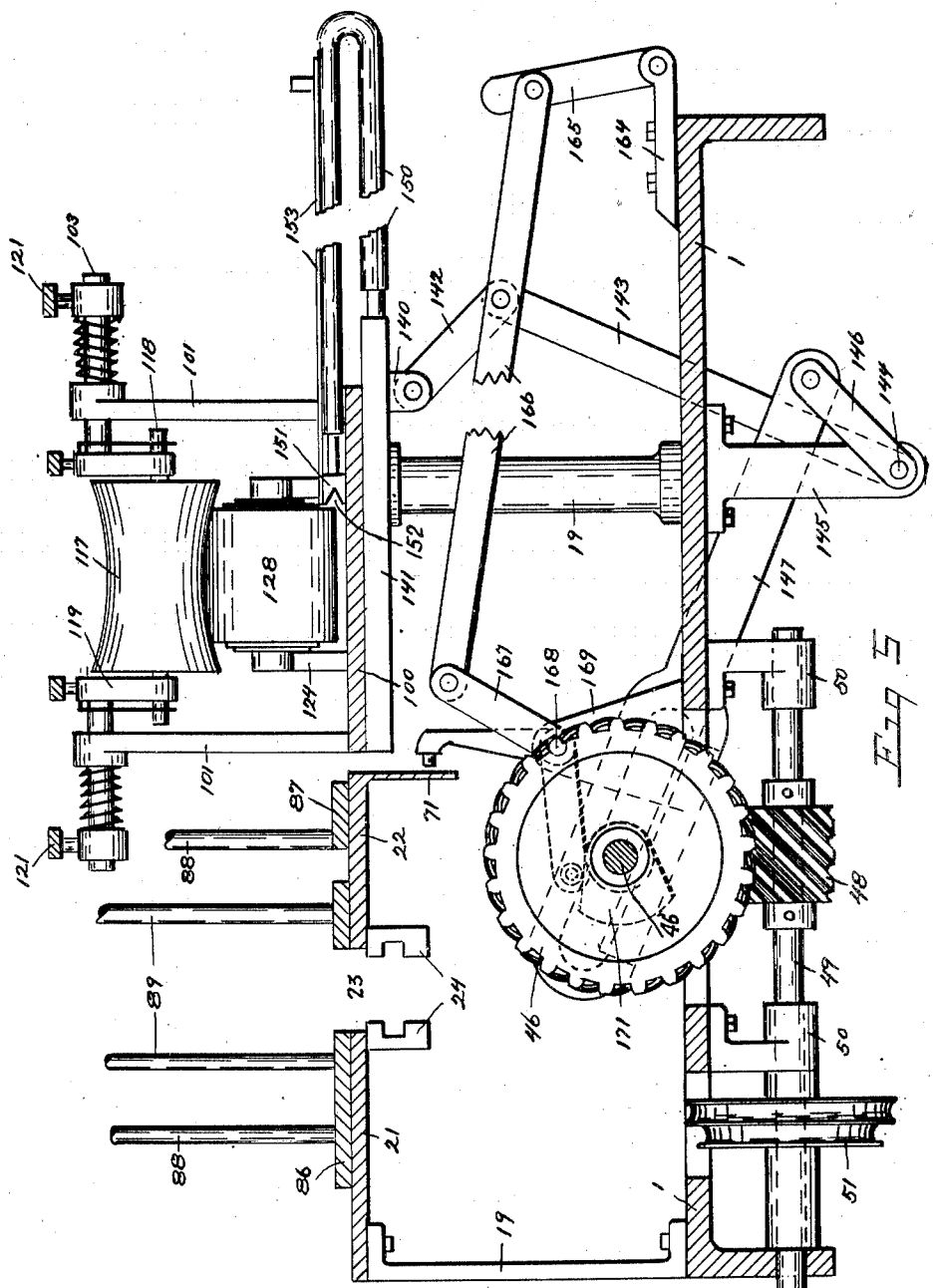

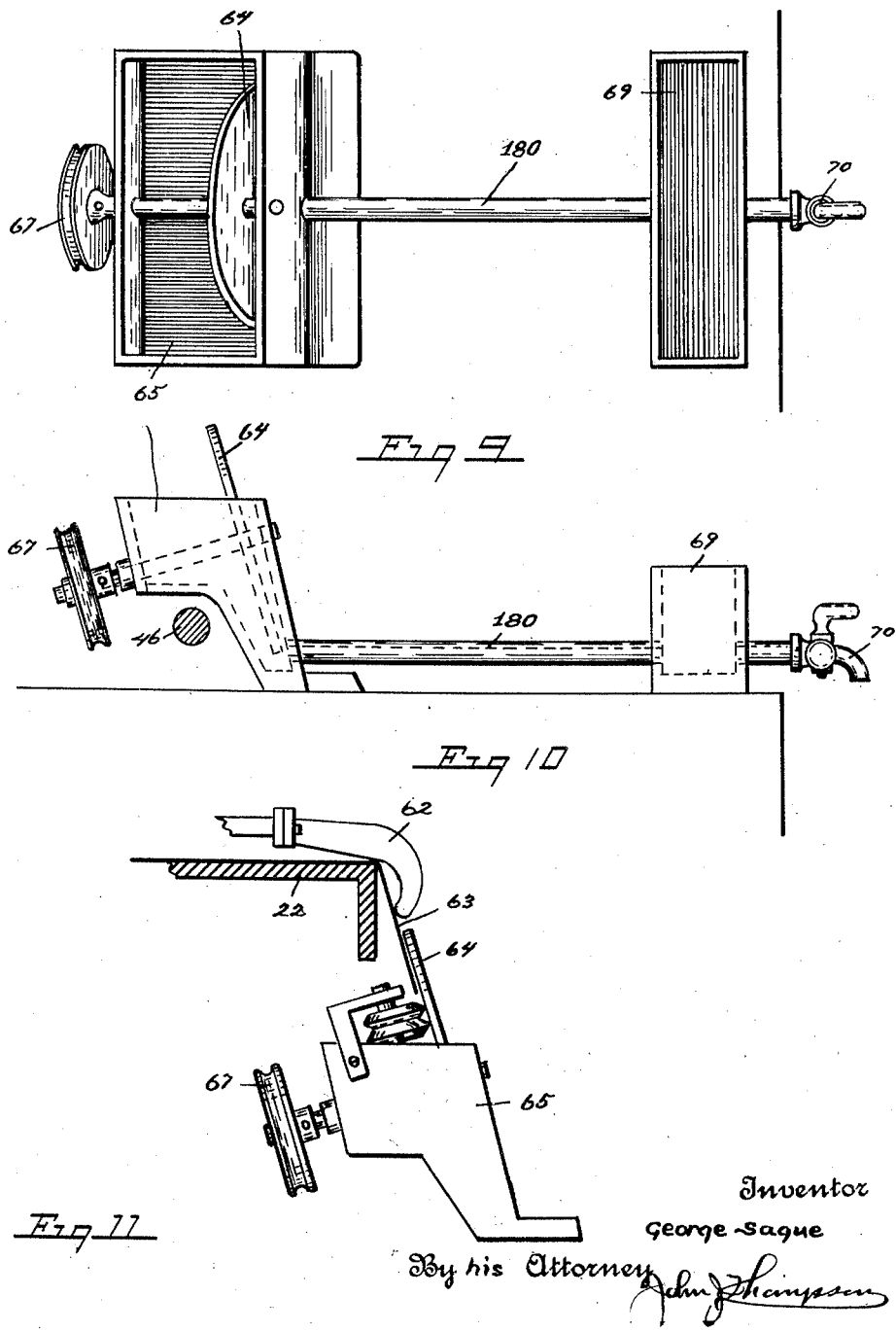

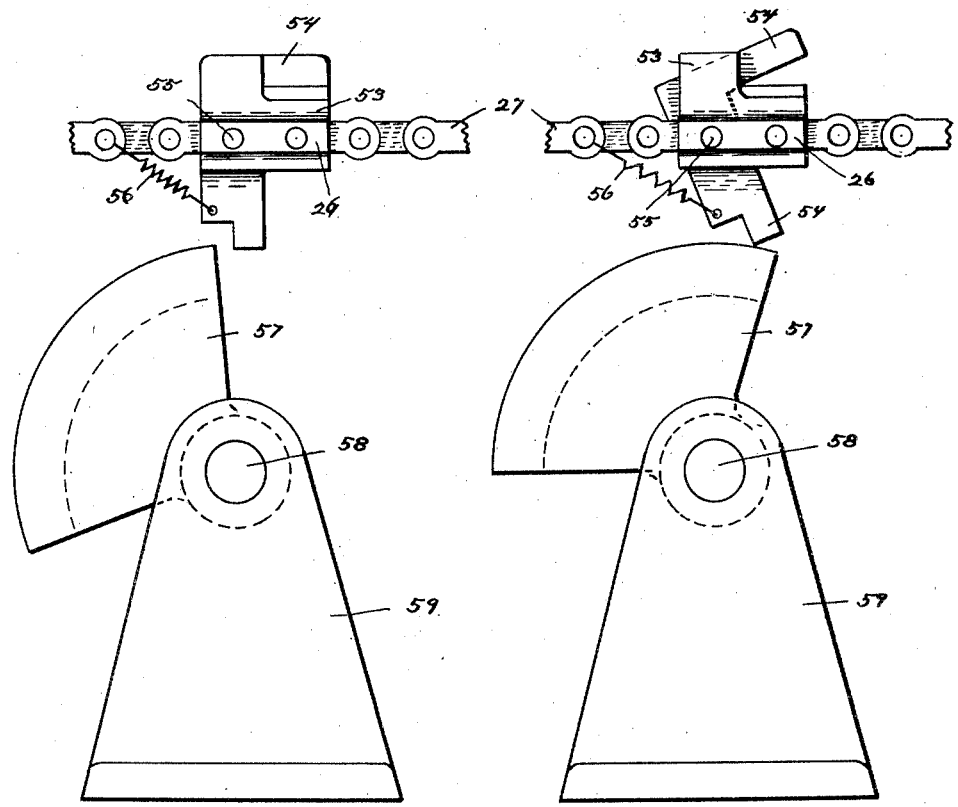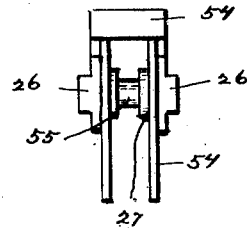

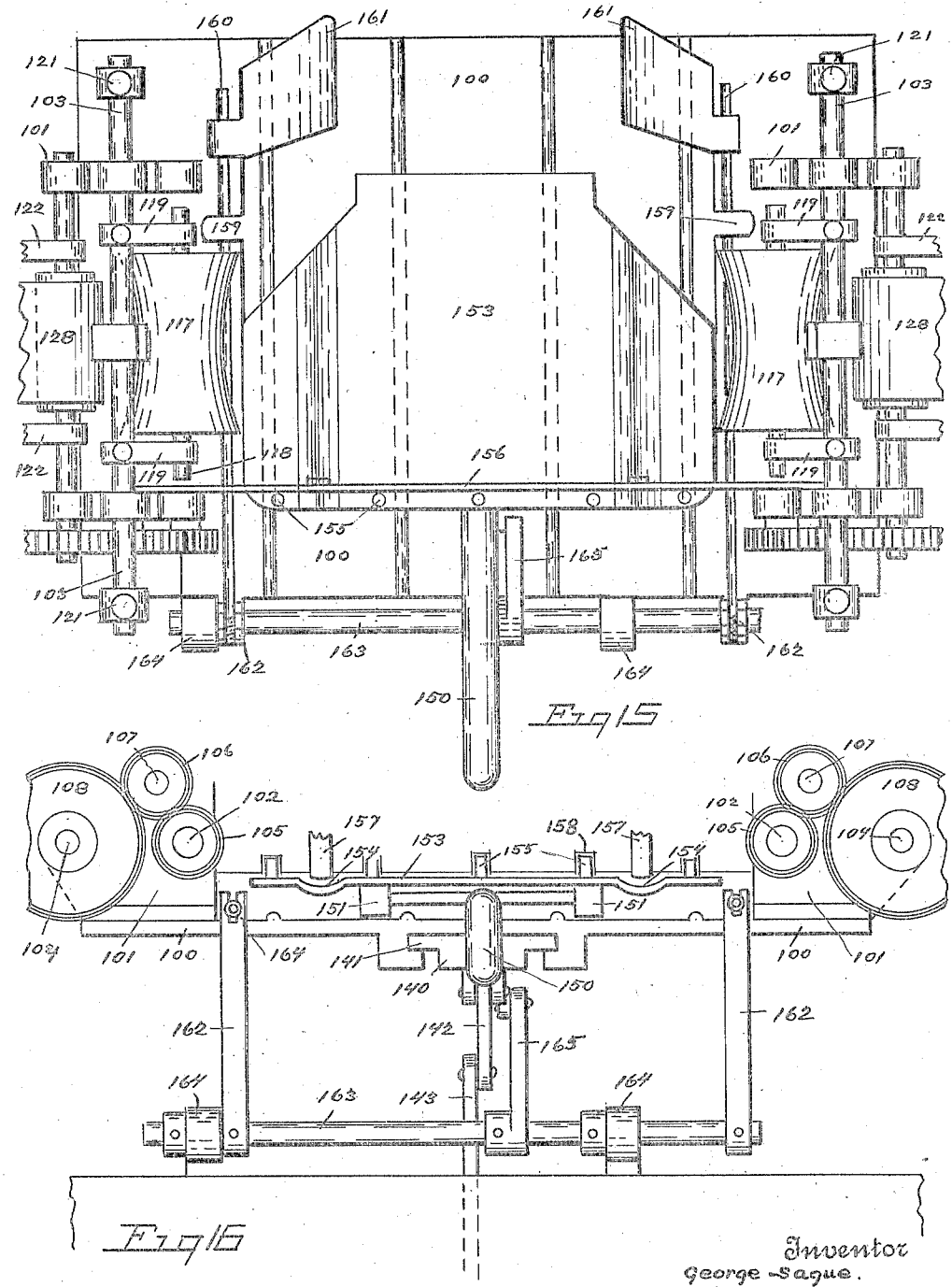

Dec. 3, 1929.　　　　G. SAGUE　　　　1,738,119
INSERTING MACHINE
Filed March 16, 1926　　12 Sheets-Sheet 10

Inventor
George Sague
By his Attorney

Dec. 3, 1929.                G. SAGUE                1,738,119
                         INSERTING MACHINE
                       Filed March 16, 1926      12 Sheets-Sheet 12

INVENTOR
George Sague
BY
John J. Thompson
ATTORNEY

Patented Dec. 3, 1929

1,738,119

UNITED STATES PATENT OFFICE

GEORGE SAGUE, OF OAKES, NEW YORK, ASSIGNOR TO GEORGE SAGUE MFG. CORP., A CORPORATION OF NEW YORK

INSERTING MACHINE

Application filed March 16, 1926. Serial No. 95,146.

In mailing large quanties of circulars, advertising matter and the like, it is the general practice to effect by hand the operation of placing the matter to be mailed in the envelopes, although machines have been devised for this purpose, but they have been found to be slow of operation, unreliable as to action, easily gotten out of order, and complicated in design.

One of the objects of the present invention is to produce a machine whereby these operations may be effected automatically, and which only requires the replenishment of the envelopes and the matter to be inserted therein.

The object of the invention is to collect together circulars, letters, single sheets, etc., of various thickness and size and to insert the same into envelopes, close and stack the same, all in an automatic manner, rapidly and economically.

A feature of the invention consists in feeding envelopes one by one from a source of supply, opening the flap of the envelope, and inserting therein the matter to be mailed in the form of a collected unit or bunch composed of the different inserts, then closing the flap and stacking the filled envelopes.

In other machines of this class it has been the practice to advance the opened envelopes step by step from one station to the next station and to receive a single insert from each station, but this method is not only slow, but when the envelope already contains one or more inserts from the previous stations and another is pushed in, it will in many cases strike the inserts already in the envelope and refuse to enter, which will clog the action of the machine and the work will pile up and require the stopping of the machine for a general clean up.

By the method and novel construction herewith employed all of the matter to be inserted into the envelope is first collected together from its various stations into a bunch or pile at a central or main station, and from there the entire bunch is inserted into the envelope; and in this manner each envelope will receive its contents, whether all of the various stations are used or not.

That is the machine may have four stations and only one, two or three employed on the job that is being run, or all of them may be used without in any way affecting the operation of the machine.

Furthermore in machines of this class there is employed for the purpose of placing the inserts or contents into the opened envelopes, a pusher, but as the envelopes are required to move ahead by an even step by step movement and after the pusher has loaded one envelope it must be receded to engage the next load, this return stroke is lost time and the movement of the envelope has to be slow to give sufficient time for the pusher to receive its next load, but by my novel means the load for the next envelope is being collected during the full stroke of the pusher both backward and forward, so that the travel of the envelopes is almost continuous and the reciprocation of the pusher is also continued without any dead time, and it will thus be seen that the action of the machine is fast and sure.

With these and other objects in view my invention consists in certain novel construction and combination of parts as will hereinafter be fully described and claimed, and illustrated in the accompanying drawings which form a part thereof and in which like figures of reference refer to corresponding parts in all of the views, but it is to be understood that I do not confine myself to the exact design as shown as slight changes may be made without departing from the spirit of the invention.

In the drawings:—

Figure 1 is a front elevation of the machine showing the general construction of the same.

Figure 2 is a back view of the same.

Figure 3 is a top plan view of the machine showing the same with the inserts and envelopes in place, and the pusher or loader in the act of filling an envelope, and also shows the arrangement of the machine when four insert supply stations are employed.

Figure 4 is an enlarged detail view of a portion of the machine showing the main driving means. Figure 4ᴬ is a detail view partly in section, of the intermittent drive used in several places in the machine.

Figure 5 is an enlarged cross sectional view of the same.

Figures 9, 10 and 11 are details of the device for moistening the flap of the envelope.

Figures 12 and 13 show the envelope gripper or pulling fingers.

Figure 14 is a cross sectional view of the conveyor chain and envelope gripper.

Figure 15 is a top plan view of the central collecting station and envelope loading device.

Figure 16 is a rear elevation of the same.

Figure 6:
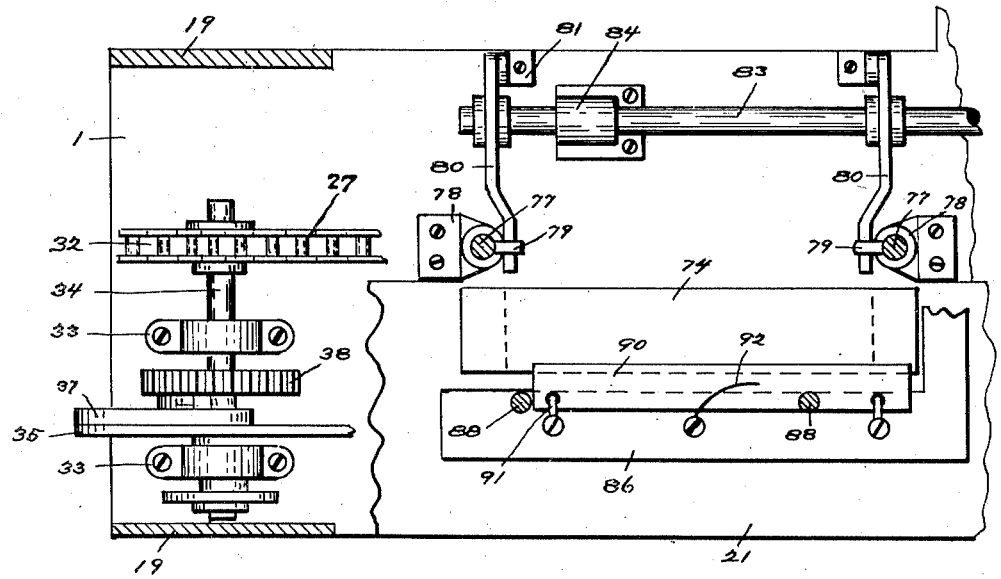
Figure 6 is a partial top plan view of the stacking device.

Referring to the drawings and in particular to Figures 1, 2 and 3 the machine comprises a main frame 1 in the form of a plate which is mounted on the legs 2, which are provided with braces 3 and a support for the motor (not shown), and upon this plate 1 are mounted the several devices, which will be described in detail in their order.

Taking first the means for conveying the envelopes through the machine and still referring to Figures 1, 2 and 3; an envelope supply station is secured to one end of the plate 1, and comprises a supporting bracket 4 formed with a guide 5 on which is adjustably mounted the rear piling guide 6 which is controlled by the adjusting screw 7 and the lock screw 8; on the transverse rods 9 are mounted the members 10 which support the side piling guide rods 11; these being adjustable also by the action of a threaded rod 12; while to the front of the bracket 4 is secured the guide 13 which has vertical adjustment by the screw 14.

The rear guide rod 15 is also provided with an adjustable foot 16 on which the rear end of the envelope pile rests; while the front end of said pile rests on the roller 17 which is secured on the transverse shaft 18 journaled in said bracket 4.

It will thus be seen that a stack of envelopes are placed in the supply station with the front end resting on the roller 17 and the rear end on the foot 16 and between the guide rods 11, 12 and 15, and that the envelopes are fed from the bottom of the stack by the rotation of the roller 17 as actuated in an intermittent manner by the pitman as will hereinafter be explained.

On a plane with the bottom of said stack is mounted on the pillars 19 and 20 a track comprising the two parallel strips 21 and 22 (see Figure 5) which are spaced apart as at 23 and have secured to their adjacent edges and depending therefrom the conveyor guides 24 formed with the groove 25 for the reception of the lugs 26 (see Figure 14) formed on the gripper member of the conveyor chain 27 which chain is endless and passes around the idler sprockets 28 which are mounted in the brackets 29 secured to the under side of the main frame 1; and the idler sprocket 30 mounted in the bracket 31 secured to the top of the frame 1; and the driving sprocket 32 secured on the shaft 34 mounted in the bracket 33 on the upper side of the main frame 1 near the end thereof.

Figure 18:
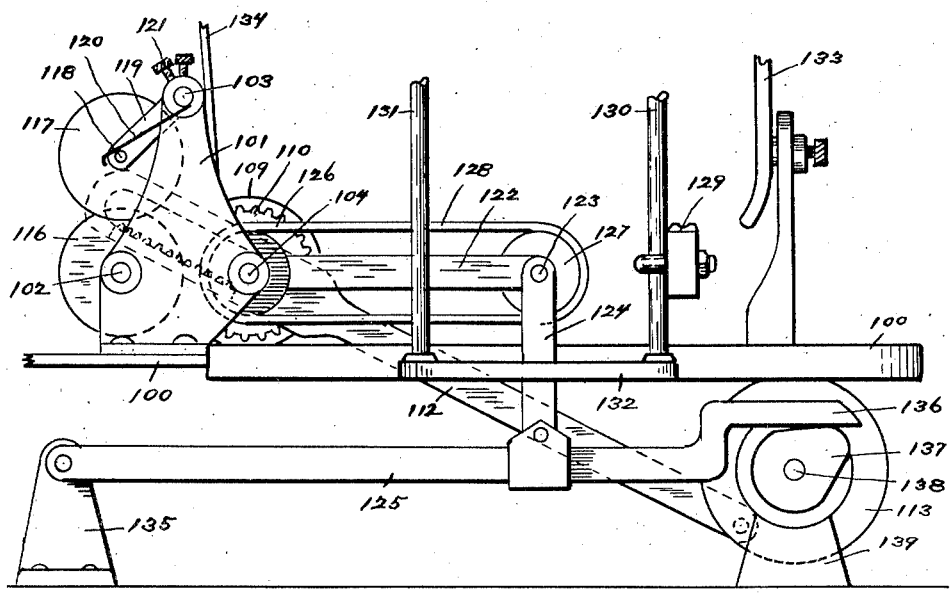
Figure 18 is a side elevation of the same.

Said shaft 34 has an intermittent rotary movement imparted to it by the reciprocation or movement of the pitman rod 35 which is formed with a slotted end 36 supplied with a rack 37 engaging a gear 38 on a disk 39, similar to that shown in Fig. 18.

The other end of the pitman rod 35 being pivoted to the end of a crank 40 (see Figure 4) secured on one end of the transverse shaft 41 which is rotatably mounted in the bearings 42 and 43 which are secured on the upper side of the frame 1; said shaft 41 being rotated by a spiral gear 44 secured thereon and driven by a gear 45 secured on the longitudinal drive shaft 46; said shaft 46 being rotated by a worm gear 47 in mesh with and driven by a worm 48 on the main drive shaft 49 which is mounted in the bearings 50 secured to the under side of the frame 1; said shaft 49 being rotated by the sheeve wheel 51 secured thereon and which is driven from the motor (not shown) by a belt, or the machine may be operated by the pulley 173 and belt 174 from a countershaft or other source of power.

On the endless conveyor chain, at stated distances apart are secured the envelope grippers (see Figures 12, 13 and 14) which comprise a link formed of a block 53 with the side lugs 26 for engagement with grooves 25 in the guides 24; said blocks 53 being slotted to receive an L shaped gripper 54, pivoted therein on one of the pins 55 of the chain, and having an upper jaw forming a clamping contact with the upper surface of the block 53 to hold the end of an envelope securely by the pressure exerted by the spring 56 which is secured to the forward link of the chain and to the depending part of the jaw member 54; and it will be seen by the drawings, this gripper during the forward travel of the conveyor is in a closed position, and is tripped or opened at the proper times by the action of a cam 57 which is mounted on a shaft 58 rotatable in the bearings 59; and the cam 52 which is secured on the shaft 41 and the rotation so timed as to open the gripper to receive the envelope as it comes from the supply magazine, carry the envelope forward to the loading station, there release it during the time of loading so that it is free to open; and then carry it into the stacker to register with the stack, and then release it by the action of the trip 172 which is secured to the guides 24 near the end of the machine.

Referring to Figure 3 on the upper side of the track 21 is secured in an adjustable manner a guide rail 59 extending from the envelope stack to the stacker, and held in place by the thumb screws 60, and having an overhanging edge 61 under which the lower edges of the envelopes slide.

Adjacent to the envelope supply is placed a curved member or opener 62 which engages the flap of the envelope as the same leaves the supply stack and folds it down as shown in Figure 11 in such a manner that as the envelope is moved forward by the conveyor the flap 63 will pass in contact with a moistener disk 64 which is rotated in a tank of water 65 mounted on the frame 1 and operated by a belt 66 on the wheels 67 and 68; said tank 65 having a drain pipe 180 and the filler tank 69 with drain cock 70 as shown in Figures 9, 10 and 11.

It will thus be seen that the flap 63 of the envelope having been moistened is held in a position at right angles to the envelope during its travel between the supply station and the closing device by a guide strip 71 secured to the back of the track 22 at right angles thereto; and after the inserts are placed in the envelope the flap is allowed to come up and enters a cone member or closer 72 mounted at a point near the stacker and which will close the flap upon the envelope as it enters the stacker.

The filled envelopes are delivered by the conveyor into the bottom of the stacker, which is formed as follows.

Figures 7, 8:
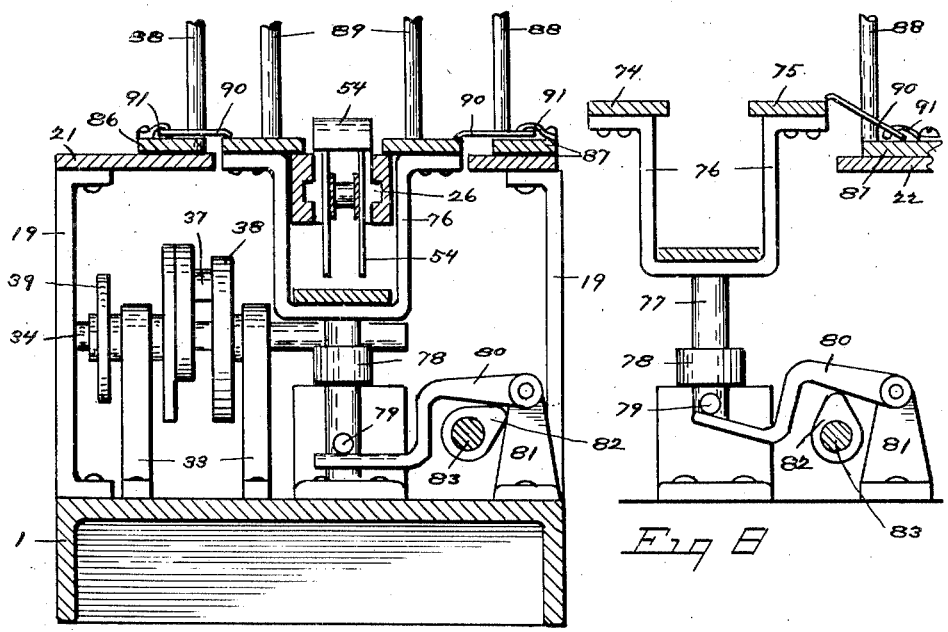
Figure 7 is a cross sectional view of the same.
Figure 8 shows the stacker in its raised position.

Referring to Figures 6, 7 and 8, the tracks 21 and 22 at this point are cut away and between them is mounted a pair of plates 74 and 75 which together comprise a width slightly less than the width of the envelope, and which are joined together near their ends by the yokes 76; said yokes 76 being in turn secured on the upper ends of a pair of vertical shafts 77 which are slidably mounted in the bearings 78 secured to the frame 1; the lower ends of said shafts 77 are provided with the pins 79 projecting therefrom and adapted to be engaged by the S shaped levers 80 which are pivoted to the brackets 81 secured to the frame 1, and which are raised by the action of the cams 82 in contact therewith and secured on the shaft 83 rotatably mounted in the bearings 84.

In its lowered position the stacker plates 74 and 75 rest on the top of the guides 24.

On the tracks 21 and 22 adjacent to the stacker are secured two plates 86 and 87 which support piling guide rods 88; while end piling guide rods 89 are secured directly to the tracks 21 and 22 near the end thereof; to the strips 86 and 87 are hinged latches 90 by the hinges 91 and under the pressure of the springs 92; these latches 90 overlapping the edges of the piler or stacker members 74 and 75 in such a manner that they are raised with the stacker but can not be lowered beyond their normal position shown in Figure 7.

As the plates 74 and 75 are raised they push up the latches 90 and the pile of envelopes resting thereon, and as they are lowered by their own weight the envelopes are supported by said latches from descending with the plates 74 and 75, and after each envelope is delivered to the stacker by the conveyor it is thus pushed up into the stack past the latches 90, and the weight of the filled envelopes in said stack will quickly seal the moist flap of the envelopes in place.

For pulling the empty envelopes from the supply stack there is provided a similar device to that employed for feeding the inserts and which comprises in part a roller 17 on the shaft 18 which is rotated in a forward direction only by a rack secured to the slotted pitman 93 which is reciprocated by the disk 68, secured on the shaft 94; and in this way the envelopes are delivered into the open jaw of the gripper.

It will thus be seen that the envelopes travel with an intermittent movement from the supply stack to the stacker and make three stops, the first under the flap opener 62, the next in register with the inserting device, and last in contact with the flap closer 72, thence into the stacker.

The insert supply stations are here shown as four in number arranged in pairs facing each other and at opposite sides of the collecting device, and as all of these insert stations are constructed and operated in the same manner, it will suffice to describe one in detail.

Figure 17:
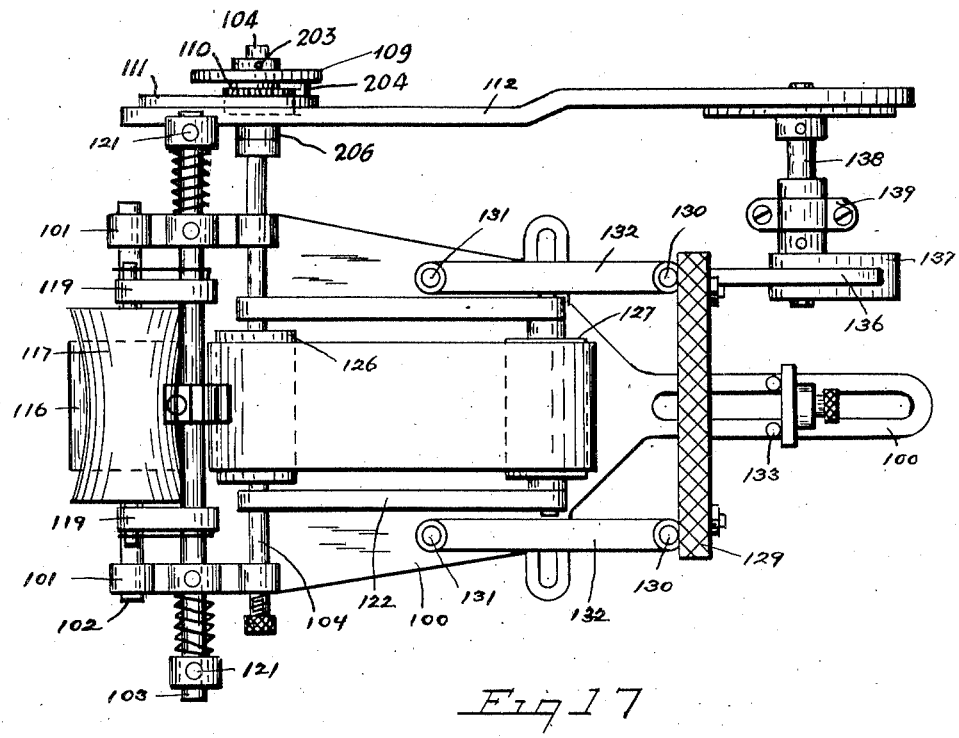
Figure 17 is a top plan view of one of the insert stations.

Referring to Figures 2, 17 and 18, the device comprises a plate 100 having secured to the forward end thereof the two uprights 101 formed with the three bearings in which are rotatably mounted the shafts 102, 103 and 104; the shaft 102 having secured thereon a small gear 105 in mesh with an idler gear 106 mounted on a stud 107 in said upright 101; said gear 106 being driven by a gear 108 on the shaft 104 in a forward direction only by the usual disk 109, gear 110, and pitman rack 111 on the pitman 112 pivoted to the disk 113 secured on the shaft 138, or in the case of the opposite insert station the pitman is operated by the disk 114 on the shaft 138. On said shaft 104 is freely mounted a spur gear 110 formed with a hub 206, on which is mounted the yoke 112 of the arm which is reciprocated in some suitable manner, and to one side of this yoke 112 is secured a rack 111 which is in mesh with said gear 202, to rotate the same in either direction as the rack is moved back and forth. To the shaft 104 is secured by a pin 203 the disk 109 which is provided with a pawl 204 actuated by a spring 205; said pawl being in engagement with the teeth of the gear 202, in such a manner that as the gear is rotated in one direction by the rack, the teeth of the gear will engage the pawl and rotate the disk and the shaft, and when said gear is rotated in the opposite direction the gear will click past the pawl and the disk will remain stationary.

In the case of employing the four insert stations, these pitmen 112 are supplied with racks on both sides in such a manner that one station will be operated on the upstroke and the other on the downstroke.

On the shaft 102 is mounted a roller 116 which may be rubber or rubber covered, and in frictional contact therewith is a concave roller 117 which is freely rotatably mounted on a shaft 118 having its ends journaled in two arms 119 pivoted to the shaft 103 and held under spring pressure by the springs 120 which are secured to the collars on the shaft 103 by the thumb screws 121.

On the shaft 104 inside the two uprights 101 are pivoted the forward ends of the two arms 122; while the other ends of said arms 122 are mounted on a shaft 123 which shaft also has pivoted to one end the upper end of the link 124; while the lower end of the link 124 is pivoted to the lever 125.

On the shaft 104 between the arms 122 is mounted a roller 126 and on the shaft 123 is also mounted a roller 127; while on both of said rollers is mounted an endless conveyor belt 128 which acts as a support and feeder for the inserts which rest thereon and on the support bar 129 which is adjustably secured to the piling rods 130 which are secured to the frame 132, said rods 130 and 131 serve as sides for the stack of inserts, while a rear adjustable guide 133 is also provided secured to the frame 100, and a front adjustable guide 134 is secured to the shaft 103 to prevent the conveyor from moving forward more than the bottom insert in the pile at one time.

As the conveyor 128 is moved forward by the action of the gear 110 and the pitman 112, a rocking movement is imparted to the stack of inserts by the raising of the rear end of said conveyor belt 128 by the action of the link 124 and lever 125 which lever has one end pivoted to the bracket 135 and its outer end formed into a hook 136 in contact with a cam 137 mounted on the shaft 138 mounted in the bearing 139 secured to the frame 1.

Referring now to Figures 5, 15 and 16, the central collecting and loading station is placed between the opposed pairs of insert stations on the plate 100 and comprises a reciprocating member 140 slidably mounted in the guide grooves 141 formed on the under side of the plate 100; said member 140 having a movement at right angles to that of the insert delivering bands 128; movement being imparted to said member by a link 142 and arm 143 having one end pivoted thereto and its other end secured on a shaft 144 mounted in the bearing 145; while to the shaft 144 is secured an arm 146 which is pivoted to the end of a pitman 147 reciprocated by the gear 148 on the shaft 46 (see Figure 4); said pitman 147 extending up through an opening 149 formed in the plate 1.

Secured to and projecting rearwardly and then up and forwardly therefrom the U shaped arm 150 is secured to the member 140, and secured on the top thereof are the pusher or loaders 151 which are spaced apart and formed with the V shaped ends 152; also upon said arm 150 and the pushers 151 is mounted the collecting plate 153; said plate being formed as shown in Figure 15, and also provided with two or more depressions or grooves 154, and a series of short posts 155 projecting upward from its rear end. As the arm 150 to which is secured the collecting plate 153 and the loaders 151 is moved forward, the loaders 151 push the collected pile of inserts from the plate 100 into the opened envelope; the arm 150 having an intermittent movement, is next at rest and the collecting plate 153 receives the next batch of inserts from their stations; which on the backward travel of the arm 150 are stripped from said plate 153 to the plate 100 by the gate 156, and are then ready to be inserted into the next envelope by the next forward movement of the arm 150.

It may here be noted that for the purpose of simplifying the drawings only two insert stations are shown in Figure 15 as the operation is the same for the four; and as shown the plate 153 is in position to receive the inserts from the two stations shown.

At a point near the rear of the plate 153 and above the same is placed a swinging gate or wiper 156 having its ends journaled in bearings on the uprights 101; and said gate is formed with teeth 157 depending therefrom and registering with the grooves 154 of the plate 153; and said gate is also formed with openings 158 to allow the pins 155 to pass therethrough as the plate 153 is reciprocated; and in this manner it will be seen that said gate 156 has free swinging movement towards the front or envelope side of the machine, but is prevented from passing a vertical position in a backward direction, its function being to wipe the collected inserts from the plate 153 off and upon the front of the plate 100 as the plate 153 is given its backward movement, then by the next forward movement of the plate 153 the V ends 152 of the pusher 151 will engage the rear side of the pile of inserts and push them into the open envelope, which is held open to receive them in the following manner.

Slidably mounted in bearings or lugs 159 formed on the plate 100 are the rods 160 which have mounted on their forward ends the curved openers 161 which enter the envelope ahead of the inserts and hold it in an expanded manner; the forward movement of these openers 161 being effected by the arms 162 which are bifurcated at their upper ends to engage the rear ends of said rods 160 and the nuts 263 threaded thereon for adjustment while the lower ends of said arms 162 are pivoted to the shaft 163 mounted in the bearings 164 secured to the plate 1; a rocking movement being imparted to said arms 162 by a crank 165 secured to said shaft 163 and operated by a link 166 pivoted thereto and to a bell crank 167 secured on a shaft 168 mounted in a bearing 169 secured to the frame 1; said bell crank 167 being provided with a roller 170 in rolling contact with the cam 171 mounted on the main shaft 49.

Said openers 161 are loosely mounted on the rods and are of such a shape that they guide the inserts into the envelope and prevent them from striking the sides or ends of the openings.

When the four insert supply stations are employed, a guard 176 is placed back of the two rear stations in such a manner that the inserts can not slide off the plate on the backward stroke and also this guard will straighten up any inserts that are not square with the plate and also prevent their getting on the pins.

Having described the construction of the machine and the operation of the principal parts, and now referring to the diagrams 19, 20, 21 and 22; it will be noted that the plate 100 is indicated as well as the plate 153 and the gate 156, and also the four insert stations herewith indicated as A, B, C, and D.

Figure 19:
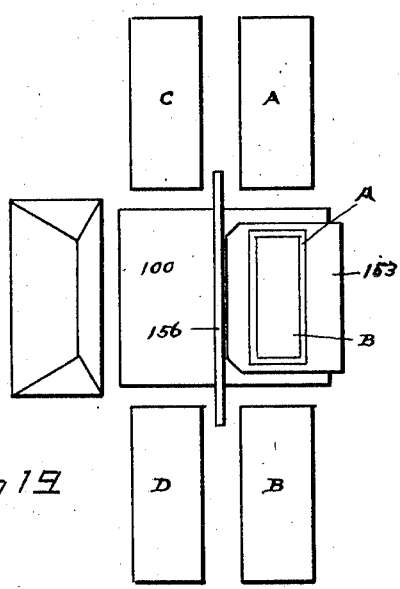
Figures 19, 20, 21 and 22 are diagrammatic views illustrating the operation of the collecting of the inserts and insertion into the envelopes.
Figure 20:
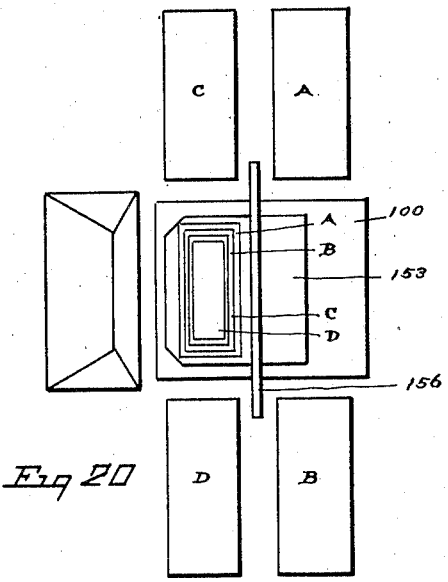
Figure 21:
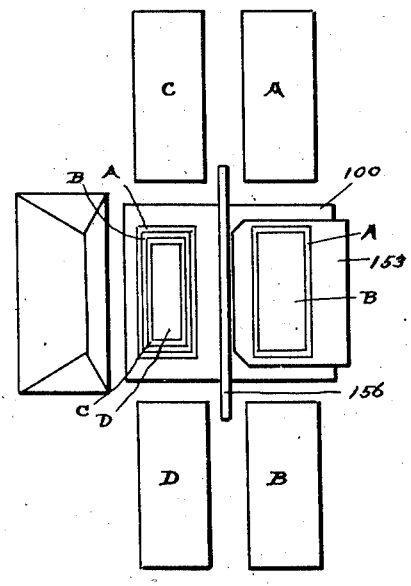
Figure 22:
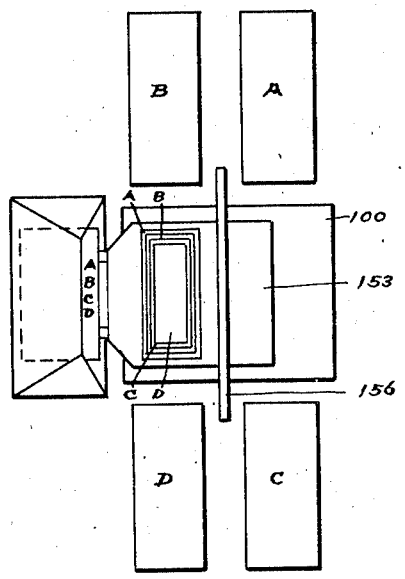

Now taking Figure 19, the plate 153 is receded and is taking on inserts from A and B, it now moves forward as shown in Figure 20, the inserts A and B passing under the swinging gate 156 and receiving the inserts from C and D, when the plate 153 again moves backward and as the gate 156 can not swing in that direction past its vertical position the collected inserts from the stocks A, B, C, and D are scraped off of the plate 153 by said gate and drop onto the plate 100, and the plate 153 receives its next load from the stocks A and B, then moves forward receiving C and D and at the same time and by the same forward movement the collected pile of inserts on the plate 100 is pushed into the opened envelope, and this same cycle is repeated over and over again, an empty envelope being brought into register with the plate 100 at every step of the process, and in this way it will be seen that there is no dead time and that in place of the pusher returning empty it is utilized as a collector and receives a load during its rearward and forward stroke while at the same time inserting the previous load into the envelope.

Figure 23:
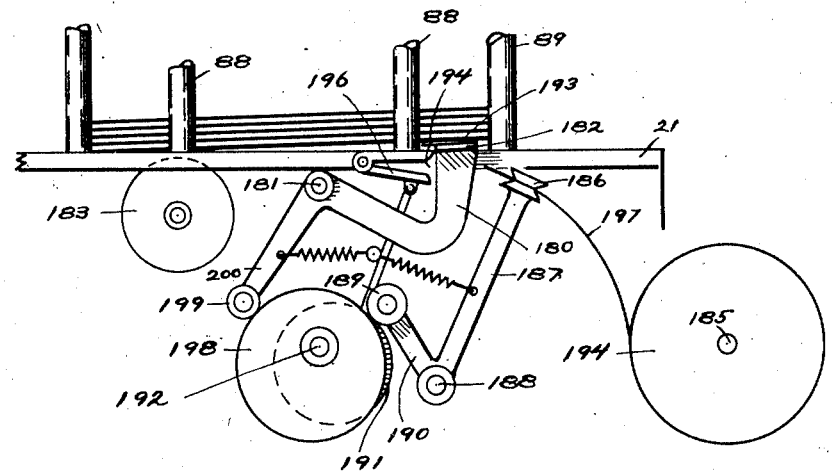
Figures 23 and 24 show means for attaching a stamp to the envelope.
Figure 24:
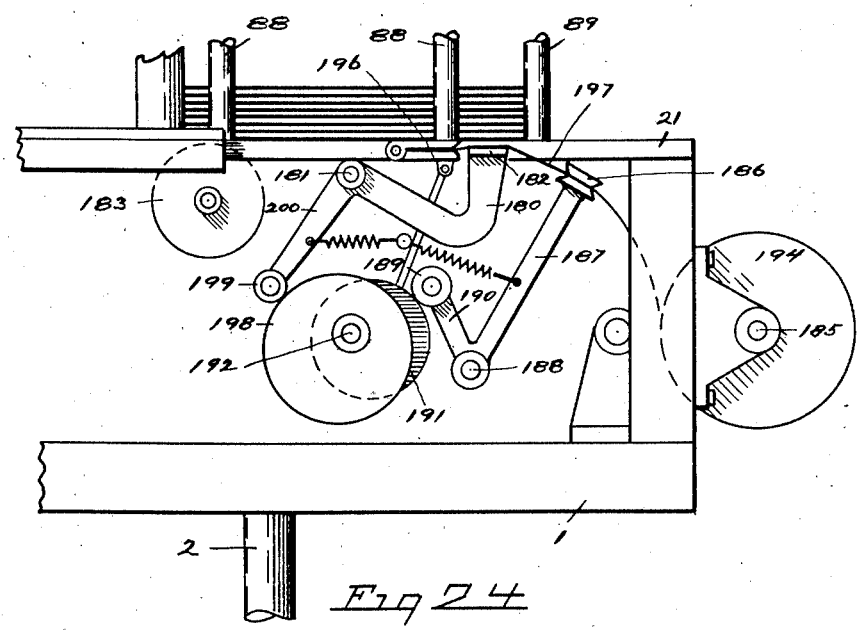

Referring to Figures 23 and 24 of the drawings, I have shown a method of attaching a stamp affixer to the machine so that as the envelopes are delivered to the stacker they may have the postage stamps affixed thereto in an automatic manner.

While any suitable stamp affixer may be adapted to the machine, I have here illustrated a simple device for the purpose which is built into the machine adjacent to the stacker.

In the drawings I have shown a portion of the end of the machine containing the stacker with the stamp affixer attached thereto, and comprising a stamp affixing arm 180 which is pivoted on the shaft 181 mounted in suitable bearings on the frame of the machine; said arm 180 is formed with a foot 182 for pressing the stamp upon the envelope which has had a portion of its surface moistened by passing over a water wheel 183 which is operated by frictional contact with the envelope as the same travels over the water wheel.

The stamps used are of the kind supplied in rolls, a roll being mounted in a suitable manner as at 185; the end of the strip of stamps being threaded through the jaw 186 of a reciprocating arm 187, mounted on a shaft 188, and reciprocated by a roller 189 mounted on the end of the arm 190 which is integral with the arm 187; said roller being in rolling contact with a cam 191 secured on the shaft 192, and rotated in any suitable manner by one of the revolving shafts of the machine.

The plate on which the envelope slides and which forms the bottom of the stacker is formed with an opening 194 through which the foot 182 carries up and affixes the stamps 193 to the envelope, and adjacent to said opening 195 is mounted a jaw 196 for holding the end of the stamp until the same is torn from the strip 197 and affixed.

This jaw 196 may be operated in any suitable manner and timed to open and close as required.

The action of the device is as follows, the strip 197 of stamps from the roll 184 is threaded through the jaws 186 of the arm 187, carried over the top of the foot 182 and the end gripped in the jaw 196.

The arm 187 now opens and moves backward on the strip 197; then closes on the strip and moves slightly forward carrying the strip with it and buckling the same between the jaws 196 and the foot 182; the stamp affixing arm 180 and the foot 182 are now raised by the action of the cam 198 secured on the shaft 192 acting on the roller 199 mounted on the end of the arm 200 which forms a part of the arm 180, raising the same, first tearing the stamp which is held by the jaws 196 from the strip 197, then as said stamp is released by the jaw 196 it is carried up on the foot 182 and pressed against the wet surface of the envelope where it is retained and pressed until dry by the next envelope which is fed into the stacker as before described; the arm 180 and foot 182 then descend, the jaw 196 opens and the arm 187 moves forward carrying the strip 197 and the end of the next stamp will enter the jaws 196 which will close on it and the jaws 186 of the arm 187 now open and as the arm 187 is moved backward they pass along the strip 197 and again grip the same to carry the same forward to buckle the same as before, and this action is repeated over and over again, the only action required on the part of the operator being to renew the roll of stamps and thread the same through the jaws.

Also it will be noted that the device shown used the last stamp of the roll, which is not possible with the stamp affixing machines now in use.

Having thus described my invention, what I claim as new and desire to secure by Letters Patent, is:

1. In an inserting machine of the class described, in combination with an envelope supply and means for conveying the envelopes through said machine, and opening and closing their flaps during said travel, of a combined reciprocating collector and loader, and insert supply stations having means for delivering inserts to said collector during its backward and forward travel.

2. In an inserting machine of the class described, in combination with an envelope supply and means for conveying said envelopes through said machine and opening and closing the same during their travel, of insert supply stations having feeding means, a loading station, a combined collector and loader adapted to receive inserts from the supply stations during its backward and forward travel, and means for transferring the collected inserts from the collector to the loading station during the backward travel of said collector.

3. In an inserting machine of the class described, in combination with an envelope supply and means for conveying said envelopes through said machine and opening and closing their flaps during said travel, of a loading station, insert supply stations provided with delivery means, a combined collecting and loading device having a reciprocating movement, and adapted to receive inserts from said insert supply stations during both its backward and forward travel, and means for transferring said inserts from said collecting plate to said loading station during the backward travel of said collecting device.

In testimony whereof I hereunto affix my signature.

GEORGE SAGUE.